(12) United States Patent
Abadi et al.

(10) Patent No.: US 9,298,924 B2
(45) Date of Patent: *Mar. 29, 2016

(54) FIXING SECURITY VULNERABILITY IN A SOURCE CODE

(71) Applicant: International Business Machines Corporation, Armonk, NY (US)

(72) Inventors: Aharon Abadi, Jerusalem (IL); Yishai Abraham Feldman, Tel Aviv (IL); Ran Ettinger, Tel Aviv (IL); Jonathan Bnayahu, Haifa (IL); Omer Tripp, Mizpe Hoshaya (IL); Yinnon Haviv, Beerotaim (IL); Adi Sharabani, Ramat Gan (IL); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/746,407

(22) Filed: Jan. 22, 2013

(65) Prior Publication Data

US 2013/0133075 A1    May 23, 2013

Related U.S. Application Data

(63) Continuation of application No. 12/792,747, filed on Jun. 3, 2010, now Pat. No. 8,819,637.

(51) Int. Cl.
*G06F 21/57* (2013.01)
*G06F 21/56* (2013.01)
*G06F 21/12* (2013.01)
*G06F 9/44* (2006.01)

(52) U.S. Cl.
CPC ............ *G06F 21/577* (2013.01); *G06F 21/125* (2013.01); *G06F 8/72* (2013.01); *G06F 21/12* (2013.01); *G06F 21/121* (2013.01); *G06F 21/563* (2013.01)

(58) Field of Classification Search
None
See application file for complete search history.

(56) References Cited

U.S. PATENT DOCUMENTS

| 6,067,622 A * | 5/2000 | Moore | G06F 21/121 380/45 |
| 6,748,589 B1 * | 6/2004 | Johnson et al. | 717/150 |
| 7,269,845 B1 * | 9/2007 | Rygaard | G06F 21/12 709/223 |
| 7,490,268 B2 | 2/2009 | Keromytis et al. | |

(Continued)

FOREIGN PATENT DOCUMENTS

WO    2008155779    12/2008

OTHER PUBLICATIONS

Lengauer, T., et al., A Fast Algorithm for Finding Dominators in a Flowgraph, ACM Transactions on Programming Languages and Systems, vol. 1, No. 1, Jul. 1979, pp. 121-141, [retrieved on Sep. 18, 2012], Retrieved from the Internet: <URL:http://dl.acm.org/>.*

(Continued)

*Primary Examiner* — Thuy Dao
*Assistant Examiner* — Geoffrey St Leger (57) ABSTRACT

A computer implemented method for automatically fixing a security vulnerability in a source code is disclosed. The method includes obtaining identification of code that sends tainted data to corresponding sink code in the source code; and automatically fixing the vulnerability by automatically performing code modification which is selected from the group of code modifications consisting of: code motion and code duplication.

14 Claims, 7 Drawing Sheets

(56) References Cited

U.S. PATENT DOCUMENTS

| | | | | |
|---|---|---|---|---|
| 2003/0037245 | A1* | 2/2003 | Cuenod | G06F 21/125 713/189 |
| 2005/0198527 | A1 | 9/2005 | Johnson et al. | |
| 2006/0212941 | A1* | 9/2006 | Bronnikov | G06F 21/577 726/24 |
| 2007/0156644 | A1* | 7/2007 | Johnson | G06F 21/577 |
| 2007/0234070 | A1* | 10/2007 | Horning et al. | 713/190 |
| 2007/0240138 | A1* | 10/2007 | Chess et al. | 717/143 |
| 2007/0271617 | A1 | 11/2007 | Mitomo et al. | |
| 2008/0184208 | A1* | 7/2008 | Sreedhar | G06F 21/577 717/128 |
| 2009/0222923 | A1* | 9/2009 | Dixon | G06F 21/563 726/24 |
| 2010/0070948 | A1* | 3/2010 | Rama | G06F 8/72 717/105 |
| 2011/0126288 | A1* | 5/2011 | Schloegel et al. | 726/25 |

OTHER PUBLICATIONS

Lo, R., et al., Aggregate Operation Movement: A Min-Cut Approach to Global Code Motion, Lecture Notes in Computer Science, vol. 1124, 1996, pp. 801-814, [retrieved on Dec. 31, 2014], Retrieved from the Internet: <URL:http://link.springer.com/chapter/10.1007/BFb0024780#>.*

Dysart, F., et al., Automated Fix Generator for SQL Injection Attacks, 19th International Symposium on Software Reliability Engineering, 2008, pp. 311-312, [retrieved on Mar. 31, 2014], Retrieved from the Internet: <URL:http://ieeexplore.ieee.org/>.*

Bisht, P., et al., Automatically Preparing Safe SQL Queries, Lecture Notes in Computer Science, vol. 6052, 2010, pp. 272-288, [retrieved on Mar. 31, 2014], Retrieved from the Internet: <URL:http://link.springer.com/chapter/10.1007%2F978-3-642-14577-3_21#>.*

Bandhakavi, S., et al., CANDID: Preventing SQL Injection Attacks using Dynamic Candidate Evaluations, CCS'07, 2007, pp. 12-24, [retrieved on Mar. 31, 2014], Retrieved from the Internet: <URL:http://dl.acm.org/>.*

Stephen Thomas et al., "Using Automated Fix Generation to Secure SQL Statements", International Conference on Software Engineering, Proceedings of the Third International Workshop on Software Engineering for Secure Systems, p. 9, Year of Publication: 2007, ISBN:0-7695-2952-6.

Alexey Smirnov et al., "Automatic Patch Generation for Buffer Overflow Attacks", Proceedings of the Third International Symposium on Information Assurance and Security, Year of Publication: 2007, ISBN: 0-7695-2876-7.

Stephen Thomas et al., "On automated prepared statement generation to remove SQL injection vulnerabilities", 2008.

* cited by examiner

FIXING SECURITY VULNERABILITY IN A SOURCE CODE

CROSS-REFERENCE TO RELATED APPLICATION

This application is a continuation application of U.S. patent application Ser. No. 12/792,747 entitled, "FIXING SECURITY VULNERABILITY IN A SOURCE CODE", filed on Jun. 3, 2010 and is assigned to the same assignee in the present application, contents of which are incorporated by reference herein in its entirety.

BACKGROUND

The present invention relates to application security. More specifically the present invention relates to fixing security vulnerabilities in application's source code.

Web application security issues pose an imminent and growing threat. Caused primarily by security bugs in the code of an application, web application security vulnerabilities may allow an unauthorized person to view personal and confidential data of another. Security vulnerabilities may let hackers run queries on a back-end database, and possibly even take over a web server entirely.

Most organizations leave security issues to be handled by a dedicated security team, which tests the application before it goes live typically well after the application development and design are finished. Fixing security bugs then requires those teams to push the issues back to developers to perform a full iteration of late code changes, resulting in very high costs to fix what are often the simplest security bugs.

Input validation vulnerabilities amount to a majority of total cyber vulnerabilities and Structured Query Language (SQL) injection is a common example of such input vulnerability. SQL is a standard language for accessing and manipulating databases. SQL injection is a code injection technique that exploits a security vulnerability occurring in the database layer of an application. Vulnerability is said to be present when user input is incorrectly filtered for string literal escape character embedded in SQL statements and may run query on the application back-end database. SQL injection attacks are also known as SQL insertion attacks and in both instances a tainted data injected by a user to the running application is the active agent of the attack.

Three dominant approaches were developed to help the development teams cope with web application security: dynamic analysis, static analysis and run-time analysis. Dynamic analysis tests the running application from the outside. The application is tested as a closed entity. Dynamic analysis does involve looking into what happens within the application. Static analysis tests the application code directly and is similar to an automated code review. Run-time analysis tools empower dynamic and static analysis using the application code to produce the dynamic analysis tests and to monitor the application as different events occur.

Several known products and academic publications focus on static analysis for web application security. Static analysis tools scan the application code using a predefined set of security rules and candidate vulnerabilities detected are reported to the user. In mature industrial tools the static analyzer report is accompanied by generic remediation information, which proposes ways in which the developer can fix the code so as to remove the reported security vulnerability. The development team needs to implement and validate such code fixes manually, which is a subtle and error-prone task.

Since Web applications developers far outnumber security experts, typically only the most critical applications are tested with such static or dynamic analysis tools and the remaining web applications are released with high likelihood that security issues will go into production undetected.

SUMMARY

In accordance with embodiments of the present invention there is provided a computer implemented method for automatically fixing a security vulnerability in a source code is disclosed. The method includes obtaining identification of code that sends tainted data to corresponding sink code in the source code; and automatically fixing the vulnerability by automatically performing code modification which is selected from the group of code modifications consisting of: code motion and code duplication.

Furthermore, in accordance with embodiments of the present invention, there is provided a computer program product stored on a non-transitory tangible computer readable storage medium for automatically fixing a security vulnerability in a source code. The computer program includes code for obtaining identification of code that sends tainted data to corresponding sink code in the source code; and for automatically fixing the vulnerability by automatically performing code modification which is selected from the group of code modifications consisting of: code motion and code duplication.

Furthermore, in accordance with embodiments of the present invention, there is provided a data processing system for fixing a security vulnerability in a source code. The system includes a processor; a computer usable medium connected to processor. The computer usable medium contains a set of instructions, executable on the processor, for obtaining identification of code that sends tainted data to corresponding sink code in the source code; and for automatically fixing the vulnerability by automatically performing code modification which is selected from the group of code modifications consisting of: code motion and code duplication.

BRIEF DESCRIPTION OF THE SEVERAL VIEWS OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like, scripting languages such as JavaScript, JSP, and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart/s and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to embodiments of the present invention it is proposed to fix security vulnerability in an application source code in an automated process, by identifying or otherwise obtaining identification of code that sends tainted data (also referred to as "tainted code") and corresponding sink code in the source code and automatically fixing the vulnerability by automatically performing a code modification action selected from the group of code modification actions that consists of code motion and code duplication.

According to embodiments of the present invention it is suggested to follow flow of tainted data from the place in the code (referred to as the "source") that obtains it from a user or other unsecure source to the executed query (also referred to as the "sink") using automated data flow analysis and by sanitizing the tainted data that flows into the sink. Automatic code modification that includes code motion or code duplication (or both) is used to sanitize the tainted data and to preserve the full functionality and flow of the original program (contiguity).

Embodiments of the present invention are hereinafter described with reference to an SQL injection security vulnerability, by way of example. It is asserted that the present invention may be implemented on various kinds of security vulnerabilities and not only in the cases of SQL injection.

According to embodiments of the present invention code that creates an SQL statement execution with tainted parameters is replaced with the creation of a prepareStatement call, using a parameterized query with one or more placeholders, and with an addition of one or more setString sanitizers. In certain cases, code lines may be moved or duplicated (code modification), for example, creation of temporary variables and duplication of conditional blocks, in order to match the number of sanitized data inputs expected at the execute query sink and in order to preserve full functionality of the program code.

In performing the fix of security vulnerability according to some embodiments of the present invention it is suggested to translate tainted code into plan representation or even to translate the entire application source code into a plan representation. The plan calculus is a formal representation that directly expresses program semantics in terms of data flow and control flow and is therefore particularly convenient for machine manipulation.

Automated code translation into plan representation is known. In the automated translation process various transformations are performed on the representation, which are finally re-implemented on the target code.

According to embodiments of the present invention, automated code translation into a plan representation of an SQL injection vulnerability is used in correcting the vulnerability. A parameterized string query node is created where one or more placeholders replace the tainted input data and the call of an SQL statement node is replaced with a call of a prepareStatement node, adding one or more setString sanitizer nodes. Inputs to prepareStatement node are connected to outputs of the parameterized string query node. Additional nodes for creation of temporary variables, duplication of conditional blocks or other glue code, may be applied in order to match the number of sanitized inputs expected at the executeQuery node (the sink) and in order to preserve correct program code functionality. Then the corrected plan is translated back into target code. The resulting target code is now secured and at the same time fully compatible with the original source code.

Figure 1:
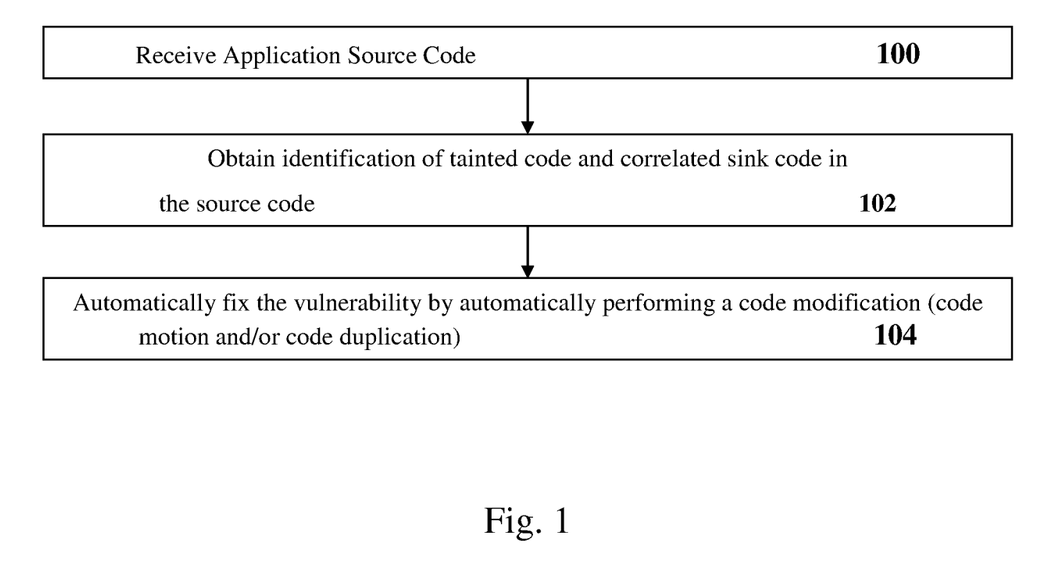
FIG. 1 is a flow chart illustrating a method of automatically fixing an SQL injection vulnerability in an application source code according to embodiments of the present invention.

FIG. 1 is a flow chart illustrating a method of fixing security vulnerability in an application source code according to embodiments of the present invention. A method of fixing a security vulnerability includes receiving an application source code 100, obtaining identification of code that sends tainted data and a corresponding sink in the code 102, and automatically fixing the vulnerability by automatically performing a code modification action selected from the group of code modification actions that consists of code motion and code duplication (104), to obtain fixed target code.

Code motion may include, for example, code reordering and code shifting (transferring). Other code modification actions, such as, for example, code addition and code deletion, may also be performed.

According to embodiments of the present invention automatic data flow analysis may be performed using known automated data flow analysis tools.

According to embodiments of the present invention, after performing automatic data flow analysis other code modification actions may be performed, such as, for example, code addition and code modification.

Figure 2:
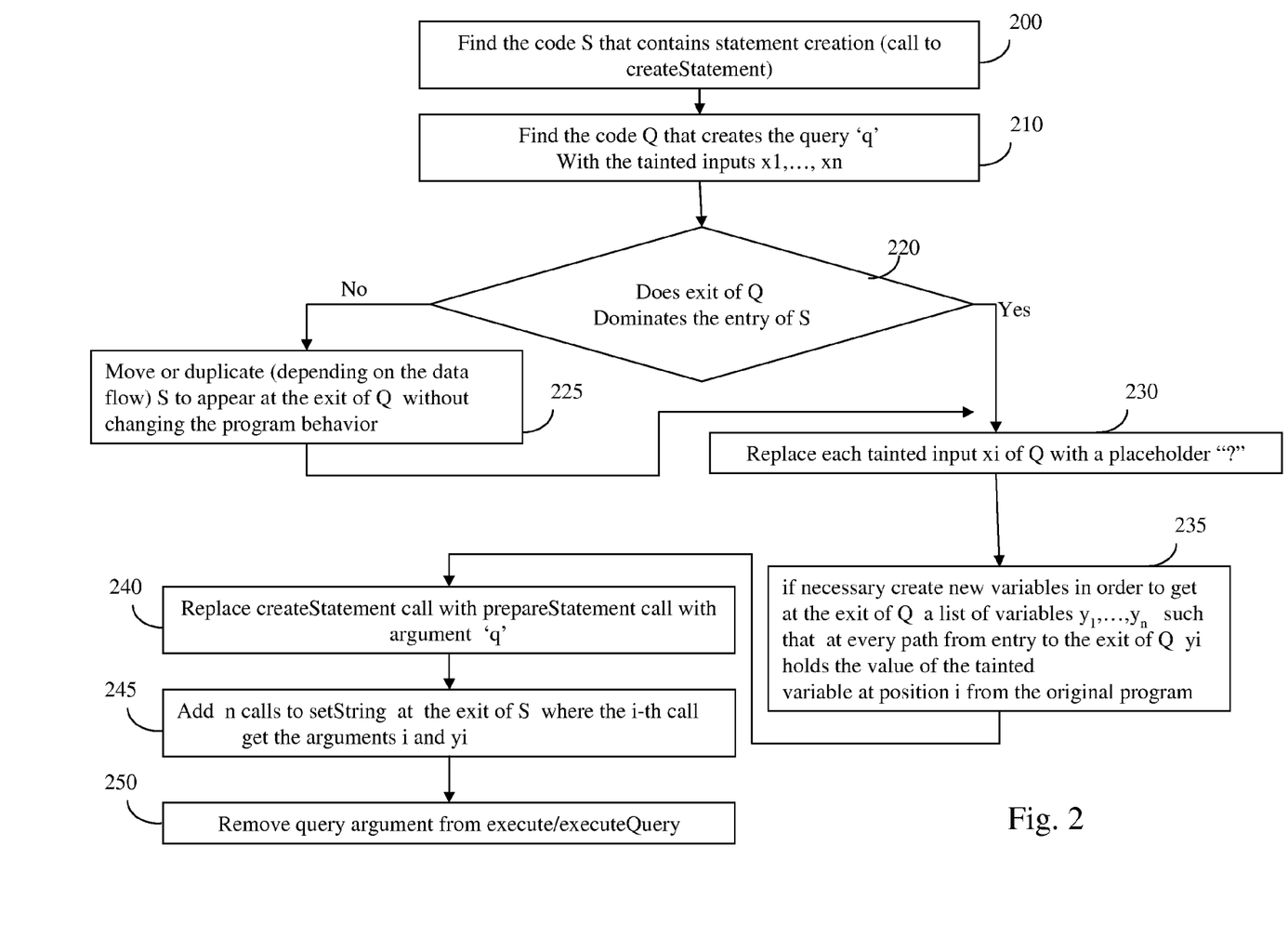
FIG. 2 is a flow chart illustrating an algorithm for fixing an SQL injection vulnerability in a source code according to embodiments of the present invention.

FIG. 2 is a flow chart illustrating an algorithm for fixing an SQL injection vulnerability in a source code according to embodiments of the present invention. The method includes finding 200 a code S that contains statement creation, i.e. a createStatement call, relating to a certain executeQuery sink in application source code and finding a code Q that creates a string query q 210 relating to the same executeQuery sink and with tainted inputs $X_1, \ldots, X_n$. The method further includes determining 220 whether the exit of Q dominates the entry of S.

If the exit of the query call Q does not dominates the entry of S 220, the method further includes moving or duplicating code lines to place the computation of S following the computation of Q without changing the program behavior 225 before replacing tainted data inputs with placeholders in box 230. Duplication may be necessary when some of the values computed by S are used in other places as well.

The method further includes replacing each tainted input of the string query $X_i$ with a placeholder "?" in the parameterized string query 230. The method may further include creating one or more new variables in order to get at the exit of the string query Q a list of variables $Y_1, \ldots, Y_n$ such that at every path from entry to the exit of the query Q $Y_i$ holds the value of the tainted input at position i of original code S 235. Such new variables are needed, for example, when the computation of the parameters is done in different ways depending on some condition. The method further includes replacing the createStatement call with a prepareStatement call with the string query q as input 240 and adding one setString (or other appropriate) sanitizer for each $Y_i$ and where the i-th setString call get the argument i and the input data $Y_i$ 245. The method further includes removing the query argument from execute or executeQuery 250.

Addition of placeholders 230, creation of new variables when needed 235, addition of prepareStatement call 240 and of setString calls 245 are examples of added code which is added automatically according to embodiments of the present invention to source code to sanitize tainted input data. Automatically fixed target code is now secured and compatible with the original source code.

According to some embodiments of the present invention plan representation is used in fixing the security vulnerability.

Figure 3:
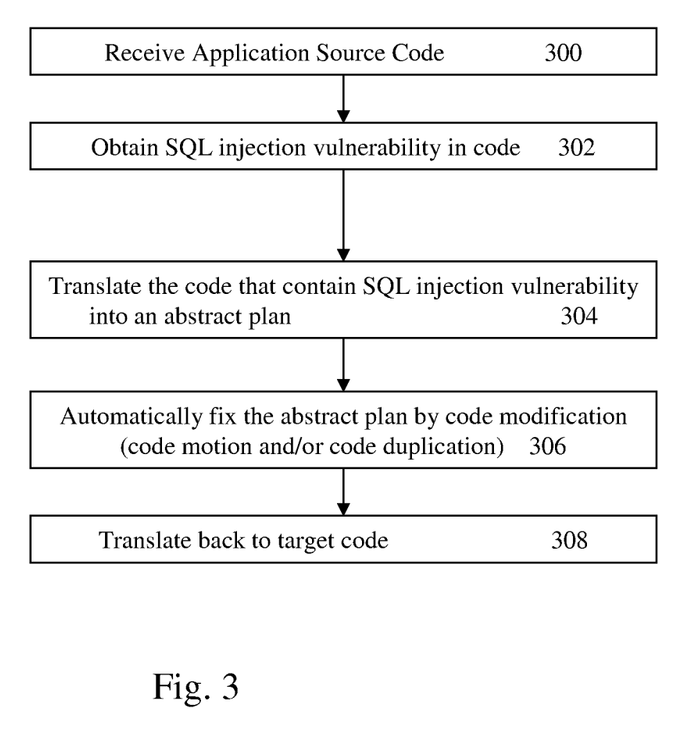
FIG. 3 is a flow chart illustrating a method for fixing an SQL injection vulnerability in a source code in which tainted code is translated into a plan representation, according to embodiments of the present invention.

FIG. 3 is a flow chart illustrating a method for fixing an SQL injection vulnerability in a source code in which tainted code is translated into plan representation, according to embodiments of the present invention. The method includes receiving application source code 300, obtaining SQL injection vulnerability in code 302, translating the code that contains SQL injection vulnerability into plan 304, automatically fixing the plan by employing code modification 306 (code motion and/or code duplication), translating back the fixed plan to target code 308.

Figure 4:
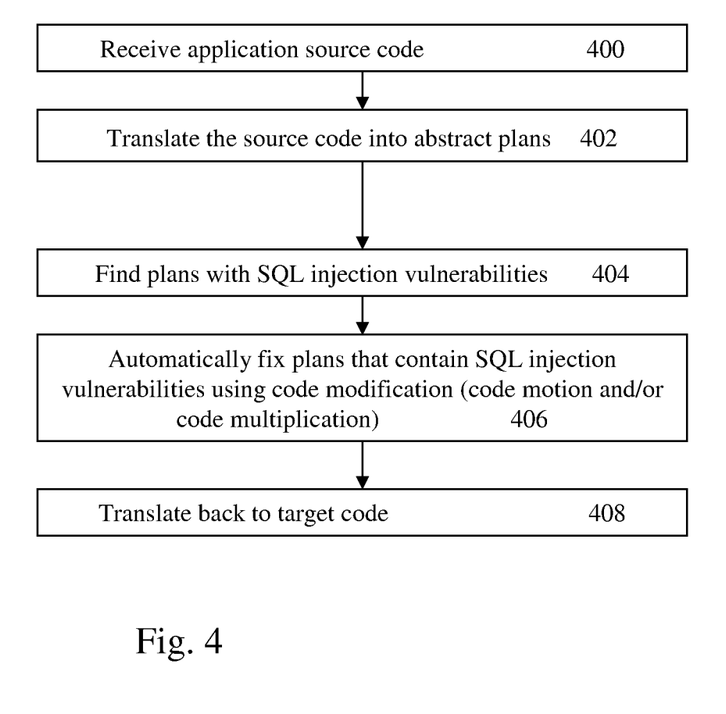
FIG. 4 is a flow chart illustrating a method for fixing an SQL injection vulnerability in a source code in which the entire code is translated into a plan representation, according to embodiments of the present invention.

FIG. 4 is a flow chart illustrating a method for fixing an SQL injection vulnerability in a source code in which the entire code is translated into plan representation, according to embodiments of the present invention. The method includes receiving application source code 400, translating the entire source code into plans 402, finding plans with SQL injection vulnerabilities 404, automatically fixing plans that contain SQL injection vulnerabilities using code modification 406 and translating back the entire code to target code 408.

Figure 5:
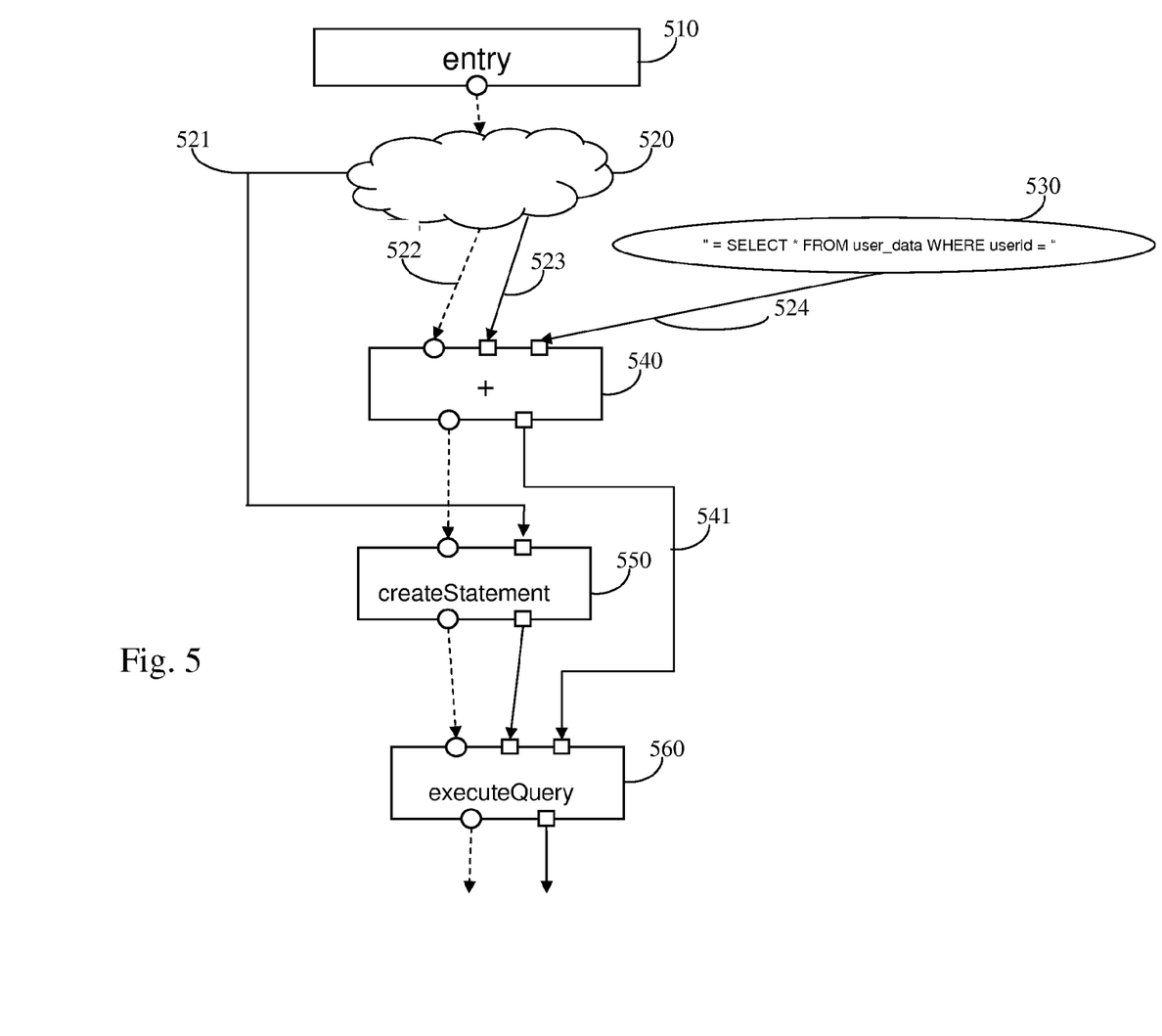
FIG. 5 illustrates an SQL injection vulnerability with tainted data input, represented in the form of a plan.

FIG. 5 illustrates an SQL injection vulnerability with tainted data input, represented in the form of a plan. A plan representation may typically include nodes and edges. A node may have one or more ports associated with it, either input ports (drawn on top of the node) or output ports (drawn at the bottom of the node). Data ports (squares) are connected by data-flow edges (full arrows), whereas control-flow ports (circles) are connected by control-flow edges (dashed arrows). Plan entry block 510 has a control output port connected to cloud 520 which represents, for example, constants, pointers calculation and connections 522 and 523 to string query node 540 and connection 521 to createStatement node 550. An SQL statement call 530 enters string query node 540 through connection 524 and tainted input data, Accountnumber 523, enters string query node 540 through connection 523. excuteQuery node 560 receives the tainted Accountnumber data through connection 541. excuteQuery node run queries on the application back-end database and if not secured such queries may be used to manipulate and even destroy the application database.

Figure 6:
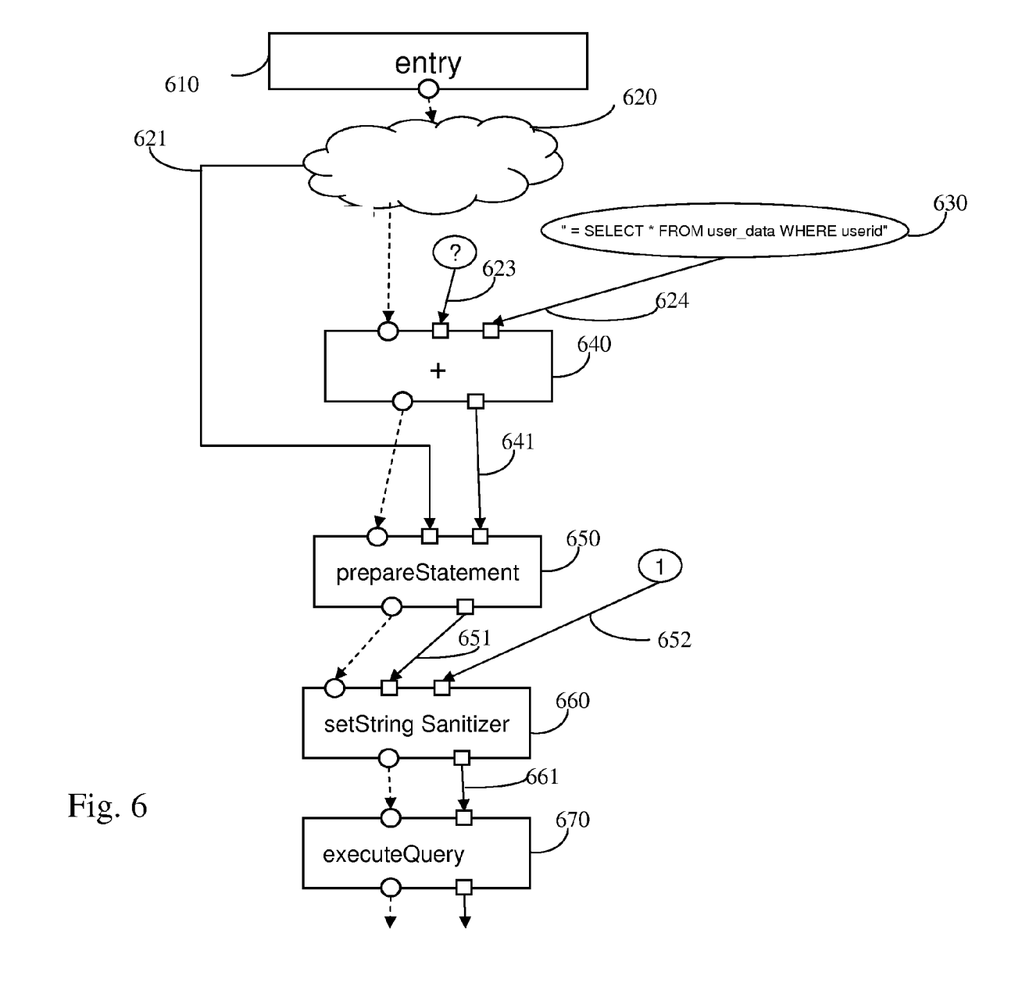
FIG. 6 illustrates fixing the SQL injection vulnerability depicted in FIG. 5 on the plan representation, according to embodiments of the present invention.

FIG. 6 illustrates fixing the SQL injection vulnerability depicted in FIG. 5 on the plan representation, according to embodiments of the present invention. Plan entry block 610 has a control output port connected to cloud 620 which represents for example constants, pointers calculation and connection to parameterized string query node 640 and connection 621 to prepareStatement node 650. An SQL statement call 630 enters the parameterized string query node 640 through connection 624. Parameterized string query node 640 adds a placeholder through data port input 623 and a parameterized statement is created and is further connected to prepareStatement node 650 through connection 641. prepareStatement node output 651 is connected to setString node 660 which is further connected to the executeQuery node 670 through connection 661. setString node 660 further receives the user input data Accountnumber through connection 651 and a value 1 through connection 652 indicates that the Accountnumber variable is the first variable at the input variable list. Thus, connection 661 to excuteQuery node 670 prevents insecure data from running queries on the application back-end database.

The following examples show an input source code and a fixed target code which is automatically obtained, demonstrating code modification that may include duplication of code lines, code line motion and new code lines.

The first example shows a typical SQL injection vulnerability found in a source code with a multiple number of tainted data inputs.

The typical operation sequence is first creating a connection, then creating a statement object, then preparing a query and finally executing the query. According to embodiments of the present invention the sequence of operations is changed by placing placeholders before creating a prepared-statement object and replacing the statement object at the final execution step with the prepare-statement object output which is further processed by an additional setString call.

Example 1

Input Source Code

```
public static String addUser(String username, String password,
      String firstname, String lastname) {
   try {
      Connection connection = getConnection( ) ;
      Statement statement = connection.createStatement( ) ;
      statement.execute("INSERT INTO PEOPLE
(USER_ID,PASSWORD,FIRST_NAME,LAST_NAME,ROLE) VALUES ('" + username +
"','" + password + "', '" + firstname+"', '" + lastname +
"','user')") ;
      return null;
   } catch (SQLException e) {
      return e.getLocalizedMessage( ) ;
   }
}
```

A corresponding fixed target code would be:

```
public static String addUser(String username, String password,
   String firstname, String lastname) {
   try {
      Connection connection = getConnection( );
      String query = "INSERT INTO PEOPLE
(USER_ID,PASSWORD,FIRST_NAME,LAST_NAME,ROLE) VALUES
(?, ?, ?, ?, 'user')";
      PreparedStatement statement =
            connection.prepareStatement(query) ;
      statement.setString(1, username) ;
      statement.setString(2, password) ;
      statement.setString(3, firstname) ;
      statement.setString(4, lastname) ;
      statement. execute( ) ;
      return null;
   } catch (SQLException e) {
      return e.getLocalizedMessage( ) ;
}
```

The addition of placeholders '?', prepareStatement call and setString calls are new code lines and code characters added automatically to sanitize the tainted data. The creation of the statement has been moved following the creation of the query, as required by the API of prepared statements.

Example 2 below demonstrates how conditional blocks are handled with embodiments of the present invention.

Input Source Code:

```
public void getUser1(String accountNumber, String x, String y)
      throws SQLException {
   String query ;
   Connection connection = getConnection( ) ;
   Statement statement = connection.createStatement (
         ResultSet.TYPE_SCROLL_INSENSITIVE,
         ResultSet.CONCUR_READ_ONLY) ;
   if (runningOnWindows( ))
      query = "SELECT TOP 1 first_name FROM user_data "
            + "WHERE userid = '" + x;
```

```
    else
        query = "SELECT first_name FROM user_data WHERE " +
            "userid = " + y ;
        ResyesultSet results = statement.executeQuery(query) ;
    }
```

The automatically obtained fixed target code would be:

```
public void getUser2(String accountNumber, String x, String y)
        throws SQLException {
    String x_Or_y = null;
    String query;
    Connection connection = getConnection( ) ;
    if (runningOnWindows( ) ) {
        query = "SELECT TOP 1 first_name FROM user_data " +
            "WHERE userid = ?";
        x_Or_y = x;
    } else {
        query = "SELECT first_name FROM user_data WHERE " +
            "userid = ?";
        x_Or_y = y;
    }
    Statement statement = connection.prepareStatement(query,
            ResultSet.TYPE_SCROLL_INSENSITIVE,
            ResultSet.CONCUR_READ_ONLY) ;
    statement.setString(1,x_Or_y) ;
    ResultSet results = statement.executeQuery( ) ;
}
```

In example 2 the query string may be computed in two different ways according to a condition evaluated in a conditional block that appears in the source code and must be preserved in the target code. In addition to the automatically added code shown in example 1, according to embodiments of the present invention, a new variable (x_Or_y) is automatically added to store the different tainted parameters. Another form of code modification is code motion, shown above where a statement creation using a prepareStatement call is performed after the fixed conditional block in contrast to the original source code where the statement creation was performed before the conditional block is executed.

Example 3 below demonstrates how two different queries, with and without tainted inputs are handled according to embodiments of the present invention. In addition, the created statement can belong to either connection.

Example 3

Input Source Code

```
if (exp)
    statement = connection1.createStatement( ) ;
else
    statement = connection2.createStatement( ) ;
// . . .
statement. execute(
    "SELECT TOP 1 first_name FROM user_data WHERE userid = " +
    TARGET_ACCT_NUM) ;
// . . .
statement. execute(
    "SELECT first_name FROM user_dataWHERE userid = " + x) ;
```

Example 3 demonstrates duplication of code lines. A conditional block is duplicated, in addition to new code and code motion as already shown in examples 1 and 2. In example 3, the first (untainted) query string is not a vulnerability while the second query contain a tainted data input and has to be fixed. The conditional block that creates the statement based on the value of "exp" variable may be duplicated for the creation of the prepared statement. When duplicating the conditional block, the Boolean expression (exp) may be duplicated only if it has no other dependencies and its value cannot be changed between the two evaluations of the conditional expression; even then, it would be better to calculate and store its value in a temporary variable and reuse the stored value when the duplicated conditional block is executed.

According to embodiments of the present invention, two solutions are demonstrated.

Solution 1 is—

```
if (exp)
    statement = connection1.createStatement( ) ;
else
    statement = connection2.createStatement( ) ;
// . . .
statement. execute(
    "SELECT TOP 1 first_name FROM user_data WHERE userid = " +
    TARGET_ACCT_NUM) ;
// . . .
String query =
    "SELECT first_name FROM user_data WHERE userid = ?";
if (exp)
    statement = connection1. prepareStatement(query) ;
else
    statement = connection2. prepareStatement(query) ;
statement.setString(1, x) ;
statement.execute( ) ;
```

Solution 2 is—

```
boolean test1 = exp ;
if (test1)
    statement = connection1.createStatement( ) ;
else
    statement =connection2.createStatement( ) ;
// . . .
statement. execute(
    "SELECT TOP 1 first_name FROM user_data WHERE userid = " +
    TARGET_ACCT_NUM) ;
// . . .
String query =
    "SELECT first_name FROM user_data WHERE userid = ?";
if(test1)
    statement = connection1. prepareStatement(query) ;
else
    statement = connection2. prepareStatement(query) ;
statement.setString(1, x) ;
statement. execute( ) ;
```

Figure 7:
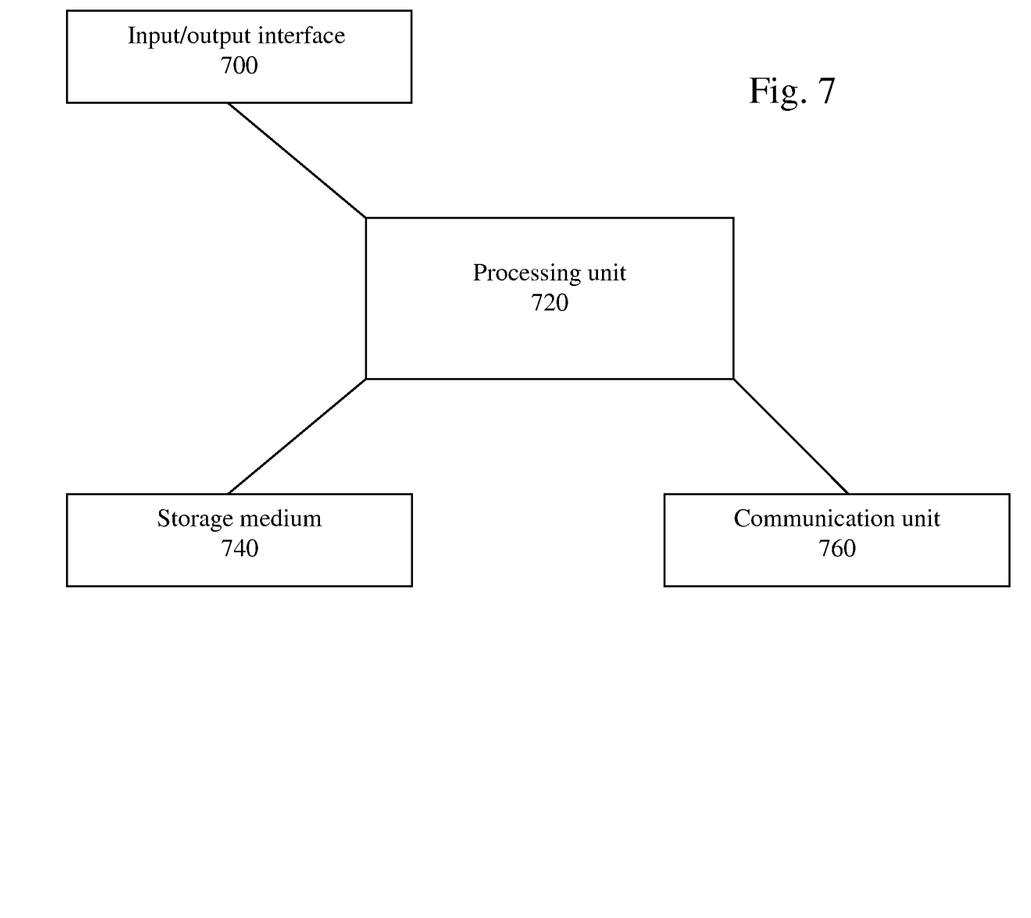
FIG. 7 illustrates a system for fixing security vulnerability in an application source code, according to embodiments of the present invention.

FIG. 7 illustrates a computerized system for fixing security vulnerability in application source code according to embodiments of the present invention.

The system, such as, for example, a computer device, may include an input/output unit 700, which may include, for example, a keyboard, a pointing device, a touch screen, a printer and a monitor. The input/output device may be used, for example, for inputting identification of the code that sends tainted data to corresponding sink code in the source code.

The system also includes processing unit 720, which may include a single processor or a plurality of processors, a computer usable medium (e.g. storage medium) 740, which may include, for example, a hard-disk, flash memory, floppy disk, disk-on-key, on which a computer executable program may be stored, which includes instructions to perform a method according to embodiments of the present invention. Computer usable medium 740 contains a set of instructions, executable on processing unit 720, for obtaining identification of code that sends tainted data to corresponding sink code in the source code; and automatically fixing the vulnerability by automatically performing code modification (which includes code motion and/or code duplication).

A communication unit 760 may be provided for communicating with another system across a communication line or a network over communication wire or wires or wirelessly. The communication unit may be used, for example, for communicating identification of the code that sends tainted data to corresponding sink code in the source code from an external information source to the system (to be saved on the storage and/or used by the processing unit).

What is claimed is:

1. A computer implemented method for automatically fixing a security vulnerability in a source code of a computer program, the method comprising:
    obtaining identification, within a source code of a computer program, of a security vulnerability in the form of a code portion that sends tainted data to corresponding sink code in the source code;
    finding the code portion that sends the tainted data that contains statement creation;
    finding the corresponding sink code that creates a query with the tainted data;
    replacing with a placeholder a variable of the code portion that sends the tainted data;
    replacing with a preparestatement call a createstatment call corresponding to the code portion that sends the tainted data;
    adding a setstring call corresponding to the code portion that sends the tainted data;
    removing a query argument from an execute/executeQuery within the code portion;
    determining whether exit from the code portion that contains the statement creation dominates entry into the sink code that creates the query; and
    if the exit does not dominate the entry, automatically fixing the security vulnerability by automatically performing code modification by performing at least one of
        moving a part of the code portion to a different location within the source code and
        copying a part of the code portion to a different location within the source code as part of modifying the source code to cause the source code to sanitize the tainted data before the tainted data reaches the corresponding sink code.

2. A computer implemented method as claimed in claim 1, further comprising performing additional code modification which is selected from the group of code modifications consisting of: code addition and code deletion.

3. A computer implemented method as claimed in claim 1, wherein the obtaining of identification of the code portion that sends tainted data to corresponding sink code includes performing data flow analysis.

4. A computer implemented method as claimed in claim 1, comprising translating the code portion that sends tainted data to corresponding sink code into a plan representation, and performing the step of automatically fixing the vulnerability on the plan representation.

5. A computer implemented method as claimed in claim 1, comprising translating the entire source code into a plan representation, and performing the step of automatically fixing the vulnerability on the plan representation.

6. A computer implemented method as claimed in claim 1, wherein the security vulnerability is a structured query language (SQL) injection vulnerability.

7. A computer implemented method as claimed in claim 1, wherein the copying includes duplication of conditional blocks to preserve full functionality of the computer program.

8. A computer implemented method as claimed in claim 1, wherein the moving includes at least one of code reordering and code shifting.

9. A computer implemented method as claimed in claim 1, wherein the code modification is performed when the exit of a query call Q in the source code does not dominate the entry of a code S in the source code that contains a statement creation.

10. A computer implemented method as claimed in claim 1, wherein the code modification is performed to place the computation of a statement creation following the computation of a fixed conditional block.

11. A computer implemented method as claimed in claim 1, wherein the copying is performed when a value computed at a location within the source code that contains statement creation is also used at another location within the source code.

12. A computer implemented method as claimed in claim 1, wherein the copying is performed to duplicate a conditional block in the source code.

13. A computer program product stored on a non-transitory tangible computer readable storage medium for automatically fixing a security vulnerability in a source code of a computer program, the computer program product including code for:
    obtaining identification, within a source code of a computer program, of a security vulnerability in the form of a code portion that sends tainted data to corresponding sink code in the source code;
    finding the code portion that sends the tainted data that contains statement creation;
    finding the corresponding sink code that creates a query with the tainted data;
    replacing with a placeholder a variable of the code portion that sends the tainted data;
    replacing with a preparestatement call a createstatment call corresponding to the code portion that sends the tainted data;
    adding a setstring call corresponding to the code portion that sends the tainted data;
    removing a query argument from an execute/executeQuery within the code portion;
    determining whether exit from the code portion that contains the statement creation dominates entry into the sink code that creates the query; and
    if the exit does not dominate the entry, automatically fixing the security vulnerability by automatically performing code modification by performing at least one of
        moving a part of the code portion to a different location within the source code and
        copying a part of the code portion to a different location within the source code
    as part of modifying the source code to cause the source code to sanitize the tainted data before the tainted data reaches the corresponding sink code.

14. A data processing system for automatically fixing a security vulnerability in a source code of a computer program, comprising:
    a hardware processor;
    a computer usable medium connected to the hardware processor, wherein the computer usable medium contains a set of instructions, executable on the hardware processor, for:
        obtaining identification, within a source code of a computer program, of a security vulnerability in the form of a code portion that sends tainted data to corresponding sink code in the source code;

finding the code portion that sends the tainted data that contains statement creation;
finding the corresponding sink code that creates a query with the tainted data;
replacing with a placeholder a variable of the code portion that sends the tainted data;
replacing with a preparestatement call a createstatment call corresponding to the code portion that sends the tainted data;
adding a setstring call corresponding to the code portion that sends the tainted data;
removing a query argument from an execute/executeQuery within the code portion;
determining whether exit from the code portion that contains the statement creation dominates entry into the sink code that creates the query; and
if the exit does not dominate the entry, automatically fixing the security vulnerability by automatically performing code modification by performing at least one of
 moving a part of the code portion to a different location within the source code and
 copying a part of the code portion to a different location within the source code
as part of modifying the source code to cause the source code to sanitize the tainted data before the tainted data reaches the corresponding sink code.

* * * * *